May 16, 1944.    J. R. OISHEI    2,348,838

WINDOW SYSTEM FOR MOTOR VEHICLES

Original Filed July 29, 1940

INVENTOR
John R. Oishei
BY
Bean, Brooks, Buckley & Bean
ATTORNEYS

Patented May 16, 1944

2,348,838

UNITED STATES PATENT OFFICE 2,348,838

WINDOW SYSTEM FOR MOTOR VEHICLES

John R. Oishei, Buffalo, N. Y., assignor to Trico Products Corporation, Buffalo, N. Y.

Original application July 29, 1940, Serial No. 348,124. Divided and this application March 15, 1943, Serial No. 479,244

8 Claims. (Cl. 268—125)

This application is a division of my application Serial No. 348,124 filed July 29, 1940.

This invention relates to a window system for motor vehicles and especially to power operated mechanism for moving the window between fully open and shut positions.

It has heretofore been proposed to regulate windows of an automobile by power operated means such as a fluid pressure motor and to control the operation of the motor by a control valve located on the adjacent body part of the vehicle. If the driver of the vehicle is alone, he will frequently take a chance while the car is in motion of reaching over and opening the window. This is dangerous since it tends to alter the steering of the vehicle and throw the latter out of its proper path of movement. At other times the remote windows might be tampered with as by children riding in the back seat, which tends to distract the attention of the motorist and consequently tends toward unsafe driving.

The main object of the present invention is to provide a window regulating system in which the windows may be selectively operated from a common control accessible to the driver of the vehicle whereby through a simple manipulation any selected window may be regulated as desired.

The invention further has for its object to provide power operating mechanism for moving a window and locking it in any selected position, such mechanism incorporating means by which the window may be manually manipulated irrespective of the locked power mechanism.

Figure 1:
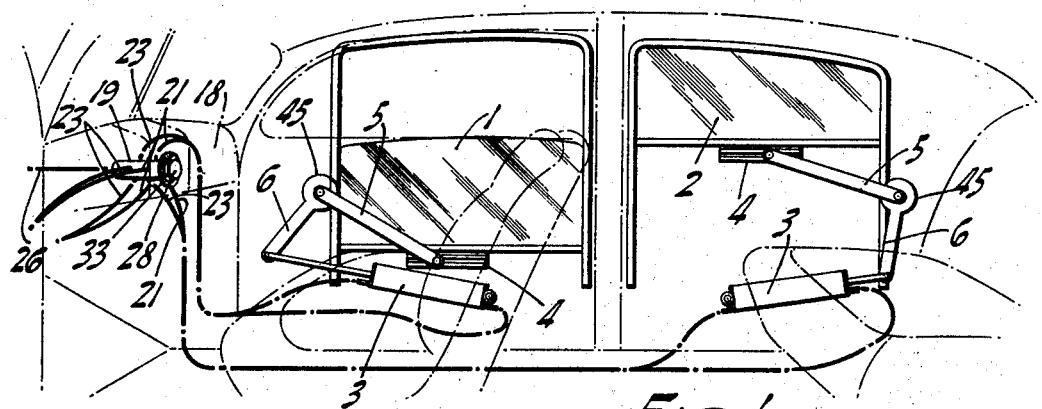
Fig. 1 is a phantom view of a motor vehicle showing more or less diagrammatically the window system constructed in accordance with the present invention.
Figure 2:
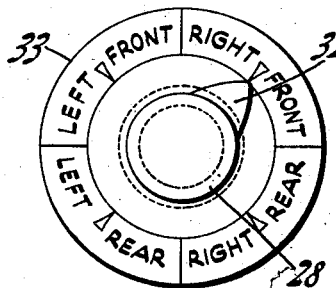
Fig. 2 is a front elevation of the control unit.
Figure 3:
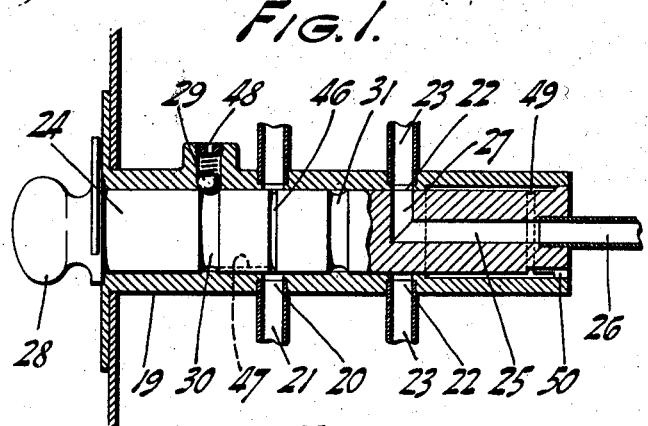
Fig. 3 is a longitudinal sectional view through the control unit.
Figure 4:
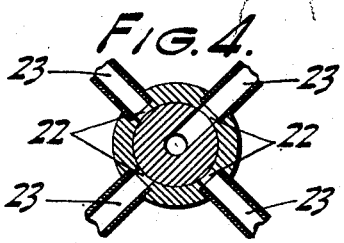
Fig. 4 is a transverse sectional view through the unit.
Figure 6:
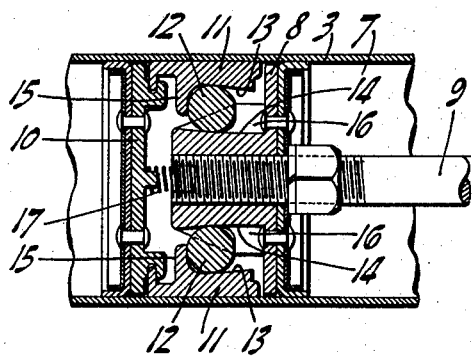

Referring more particularly to the drawing, the opened front and the closed rear windows of the vehicle are indicated by the numerals 1 and 2. Power operating mechanism is provided for each window and as illustrated herein comprises the motor 3, a window-carried track 4 and a connecting linkage interposed between the motor and the track, such linkage including a bell crank arrangement having arms 5 and 6. The motor is illustrated as being of the fluid pressure type having a cylindrical chamber 7 containing a piston consisting of a fixed section 8 carried by the piston rod 9 and a floating section 10. The window piston unit which is freely movable back and forth by a force applied to either end is adapted to be locked against window imparted movement by means of a clutch, and to this end the floating section carries a pair of brake shoes 11 adapted to be expanded outwardly against the chamber wall by means of rollers 12 riding on cam surfaces 13 and 14. Abutments 15 and 16 carried respectively by the shoes and fixed piston section are disposed at the low ends of the cam surfaces to arrest the roller and therewith provide a mechanical connection between the two piston sections. A coil spring 17 tends to hold the piston sections apart so that the brake shoes will normally be in a retracted position.

If suction is applied in the right-hand end of the chamber 7 and atmospheric pressure admitted to the left-hand end, the floating piston section 10 will be urged against the spring 17 to move toward the right and through the rollers push the fixed section and its rod 9 to open the window. A reverse pressure differential will act on the fixed piston section and cause a closing movement of the window. However, should the window be tampered with from the outside and attempted to be opened by a prying effort, this force will be transmitted by the piston rod to the fixed section and shift the cam surfaces 14 to roll the rollers along the cooperating cam surfaces 13 and 14 for expanding the brake shoes 11 against the chamber wall and thereby lock the piston against any movement.

The control unit is arranged at an accessible point such as the instrument panel 18 and may be in the form of a tubular valve casing 19 having a series of radially disposed ports 20 connected respectively by conduits 21 to one end of each of the fluid motor chambers 3. A second series of ports 22 are connected respectively by conduits 23 to the opposite end of each chamber, the ports of each series being arranged in the same radial plane but the two series are spaced axially of the valve casing 19. The valve plug or cylinder 24 is rotatably and slidably mounted within the casing 19 and has an axial bore 25 adapted to be connected by a conduit 26 to a source of suction such as the intake manifold of the vehicle engine. The bore communicates with a radial duct 27 which is selectively registrable with any port of either series, and for this purpose the plug 24 is provided with a hand knob 28 by which the duct 27 may be rotated as well as shifted in and out. A spring detent 29 carried by the casing 19 cooperates with either one of a pair of peripheral grooves 30 and 31 to hold the valve duct 27 within the plane of a selected series of ports. The hand knob is provided with a pointer 32 movable over a dial 33 which is suitably indexed to indicate the respective windows of the vehicle.

Means are provided for regulating each window manually, and since the power mechanism is automatically locked when the piston is attempted to be moved by a pull on the piston rod, it is necessary to disconnect the locked motor from the window, and according to the present disclosure this is accomplished by detachably coupling the two arms of the bell crank as by means of a clutch tooth 34 on the motor connected arm engaging in a recess on the hub 35 of the companion arm. This interengagement is secured by a spring 36. The hub 35 carries a segmental gear 37 adapted to be meshed with a pinion 38 fixed on a shaft 39. This shaft is slidably supported for axial movement to bring the pinion into meshing engagement with the gear 37. A handle 40 is pivotally mounted on the collar 41, the latter being freely slidable on the shaft 39. The outer end of the shaft is squared as indicated at 42 and the handle is provided with a socket 43 adapted to be swung over the squared end 42 to interlock therewith and simultaneously shift the gear 38 into mesh with the gear 37 so that by turning the handle the shaft and its pinion will rotate the gear 37 and its arm 5. Simultaneously with this shifting of the pinion 38 an extension 44 of the shaft 39 is designed to engage the arm 6 or a disc 45 carried thereby so as to uncouple the tooth 34 from the recess in hub 35.

From the foregoing it will be apparent that the motorist has complete control of the several windows of the car and may regulate them at will from the central point of control as provided by the valve 19, 24, and in this connection it may be pointed out that while the duct 27 is in communication with any particular motor chamber, atmospheric pressure will be admitted through the corresponding port of the companion series by means of an air groove 46 connected by a groove 47 to the detent groove 30 which has communication with the outside atmosphere through the aperture 48. A like air groove 49 having atmospheric communication through a groove 50 is utilized for admitting air to the opposite end of the motor chamber when the duct 27 is in communication with the first end of the motor chamber.

Figure 5:
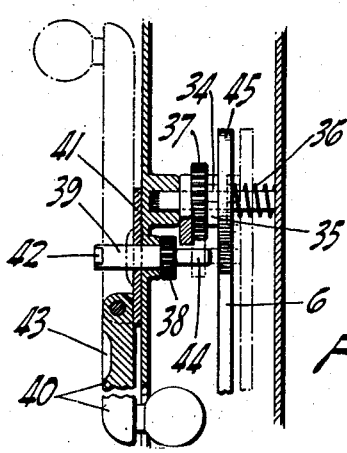
Fig. 5 is a view partly in section of the manual regulator for a particular window; and, Fig. 6 is a fragmentary longitudinal sectional view through the self-locking motor of a window operating mechanism.

The individual motors are automatically locked against a prying effort exerted on any window but irrespective of this automatic locking feature the window is readily opened manually in an authorized manner by simply swinging the normally concealed handle 40 to its operative position, as shown in the broken lines in Fig. 5.

While the foregoing description has been given in detail to illustrate the inventive principles involved, it is obvious that the invention may be incorporated in other physical embodiments without departing from the spirit of the invention or the scope of the appended claims.

What is claimed is:

1. In a window regulator and particularly a power operated regulator, the combination of a window regulator mechanism, including the parts at the load end of the mechanism and the parts at the power end of the mechanism, a clutch operating to be released by the operation of the power parts of the regulator mechanism to lock the window in position and a releasable connection for tying the power parts to the load parts to permit movement of the window in an emergency although the clutch is locked.

2. In a window regulator and particularly one of the power operated type, the combination of a load arm, a power arm, the two pivoted on the same axis but having a connection between each other which can be released and a clutch for normally locking the power arm and load arm against movement by effort originating in the load arm.

3. A motor vehicle having a window, means for manually regulating the window, a fluid motor operatively related to the window and comprising a chamber and a fluid operated member movable back and forth relative to and in the chamber, a control for the fluid motor, means for disrupting the connection between the window and the fluid motor upon operation of the manual means, and means for restoring the window previously operated by hand to a predetermined relationship to the fluid motor stroke by and during operation of the fluid motor.

4. A motor vehicle having a window movable to and from a closed position, means for manually regulating the window, power mechanism including a reciprocable member operable for regulating the window, and means operable to dissociate the power mechanism from the window by and during actuation of the manual means, said dissociating means embodying other means for insuring the reestablishment of the former operative relationship between the reciprocable member and the window by and during operation of the power mechanism and subsequent to the dissociation of the manual means from the window whereby to definitely locate the latter with the stroke of the reciprocable member.

5. A motor vehicle having a window, a fluid motor having a piston and chamber operably connected to the window to open or close the same during a single stroke of the motor and therefore adapted to be actuated by the window, means for locking the motor automatically against movement by and from the window, manual operating means for the window normally inoperative and movable into operative relation thereto, and means for disconnecting the locked motor from the window by and during establishment of the operative relation between the manual means and the window whereby the latter may be manually operated independently of the locked motor, said disconnecting means being automatically rendered inoperative in only one position of the widow relative to the motor whereby said window will be reconnected to the latter for full opening or closing movement on each stroke of the motor.

6. A window regulator for motor vehicles, and the like, comprising a window connected member, a motor having a part with a back and forth stroke, a member detachably engageable with the first member and operable by the motor part to actuate said first member on one stroke for opening a connected window and on the return stroke for closing the window, means for automatically locking the motor part against being moved by prying effort placed on the window, manual means adjacent the first member free thereof and mounted for movement into engagement therewith to effect manual operation thereof, and means operable by such movement of the manual means for disconnecting the first two members whereby the window connected member may be manually actuated without hindrance by the locked motor.

7. A window system for motor vehicles comprising a window, a fluid motor having a fluid operable member movable back and forth to open and close the window, a releasable connection operatively connecting the member to the window for movement as a unit back and forth, and a clutch operating to be released by the operation of the motor and operable to lock the unit against window imparted movement, said releasable connection being interposed between the window and the clutch and operating to release the window from the latter to permit movement of the window in an emergency although the clutch is locked.

8. A window system for motor vehicles, comprising a window, a fluid motor having a fluid operable member movable back and forth to open and close the window, a releasable connection operatively connecting the member to the window for movement as a unit back and forth, a clutch operating to be released by the operation of the motor and operable to lock the unit against window imparted movement, said releasable connection being interposed between the window and the clutch and operating to release the window from the latter to permit movement of the window in an emergency although the clutch is locked, and manually operable means for moving the window in such emergency when disconnected from the clutch.

JOHN R. OISHEI.

CERTIFICATE OF CORRECTION.

Patent No. 2,348,838. May 16, 1944.

JOHN R. OISHEI.

It is hereby certified that error appears in the printed specification of the above numbered patent requiring correction as follows: Page 1, second column, lines 23 and 24, strike out "so that the brake shoes will normally be in a retracted position" and insert instead --toward a lock applying position for minimizing any play between the sections"; page 2, second column, line 67, for "widow" read --window--; and that the said Letters Patent should be read with this correction therein that the same may conform to the record of the case in the Patent Office.

Signed and sealed this 8th day of August, A. D. 1944.

Leslie Frazer (Seal) Acting Commissioner of Patents.